May 5, 1942.  G. H. BROWN  2,281,668
APPARATUS AND METHOD FOR ADJUSTING TRANSMITTING ANTENNAS
Filed Aug. 13, 1935
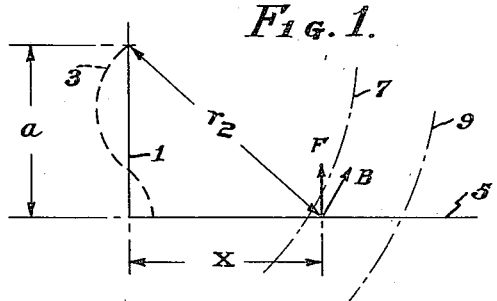
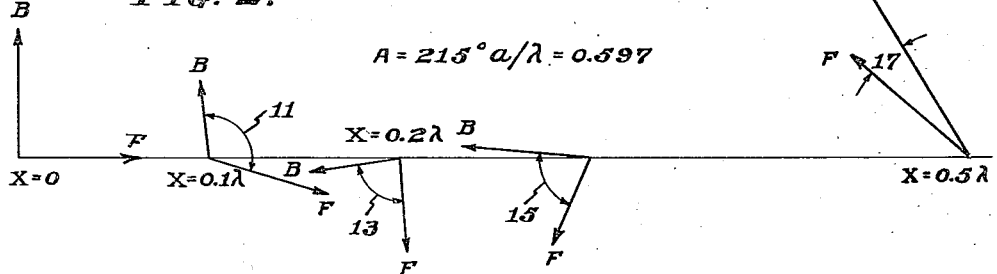
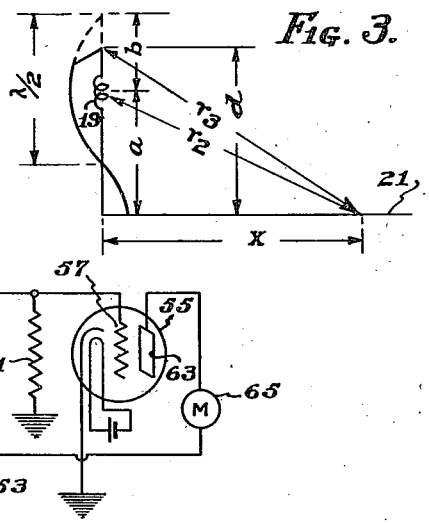
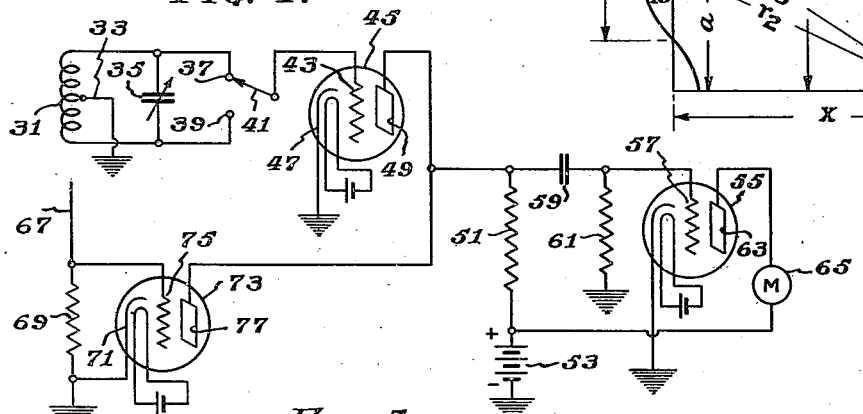
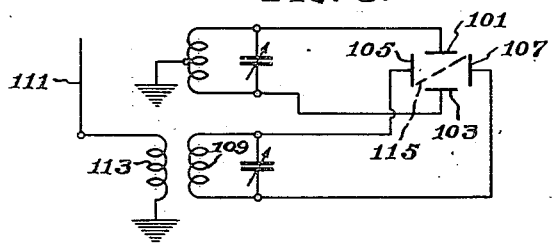
INVENTOR
George H. Brown
BY [signature]
ATTORNEY Patented May 5, 1942

2,281,668

UNITED STATES PATENT OFFICE 2,281,668

APPARATUS AND METHOD FOR ADJUSTING TRANSMITTING ANTENNAS

George H. Brown, Haddonfield, N. J., assignor to Radio Corporation of America, a corporation of Delaware Application August 13, 1935, Serial No. 35,919

6 Claims. (Cl. 250—11)

My invention relates to the adjustment of transmitting antennas. More particularly, I have devised apparatus for measuring the relation between the electromagnetic and electric strains about an antenna.

One of the objects of my invention is to determine the adjustment of a transmitting antenna which will cause the maximum effective day and/or night transmission characteristics.

Another object is to measure the relative electric and electromagnetic strains about the base of an antenna.

A further object lies in the apparatus and circuit arrangements which may be used in making the foregoing observations.

Other objects will appear from the following description of my invention.

Figure 1 illustrates a vertical antenna system and the relative electric and electromagnetic strains, Figure 2 represents the relative phase positions of the electromagnetic and electric flux at given distances from the base of a vertical antenna, Figure 3 represents a sectionalized vertical antenna system, Figure 4 is a diagram of one type of apparatus for determining the relative flux densities of electric and electromagnetic radiation near the base of an antenna, and Figure 5 is a diagram of other circuits for measuring the phase relations of electric and electromagnetic strains near the base of an antenna.

In my copending application Serial No. 33,281, filed July 26, 1935, Patent No. 2,068,261, granted January 19, 1937, entitled "Transmitting antennas" I describe a sectionalized antenna which may be adjusted for maximum day or night transmission. A similar adjustment may be made with a capacity top antenna, or other antennas whose relative vertical and horizontal radiation components or angle of radiation may be adjusted. The adjustment described in the above entitled application is an empirical one and requires considerable time. In the present application I shall describe a simplified method and apparatus for determining the proper adjustment of a vertical or sectionalized antenna for a given type of transmission service.

In Figure 1, I represents a vertical antenna system. The distribution of oscillatory current in the antenna is illustrated by the dotted line 3. The line 5 is a radial line extending from the base of the antenna I outward and parallel to the earth's surface adjacent the antenna. The curvature of the earth's surface immediately surrounding the antenna may be neglected. Lines 7 and 9 represent circles circumscribed about the antenna on the surface of the earth. The arrow F represents the electric strain perpendicular to earth's surface set up about the antenna by oscillatory currents flowing therein. The arrow B represents an electromagnetic strain, parallel to and just above the earth's surface, set up by oscillations in the antenna.

At distances within a wave length from the antenna the vectors F and B may assume a large number of relative positions. Figure 2 is an illustration which shows the relative angular tune positions of F and B and at distances $x=k\lambda$ from the antenna. At $x=0.1\lambda$ the relative phase angle of B and F is shown as II. At $x=0.2\lambda$ the phase angle is represented by 13, and likewise at $0.3\lambda$ by 15 and at $0.5\lambda$ by 17. An inspection of the relative angular positions of B and F in Figure 2 shows that at some position B and F will have an angular time relation of 90°. By experiment, I have found that this position varies with the effective vertical antenna length. If the vertical antenna length $a$ is 190°, the position of $x$ will differ from the position found for an effective antenna length of 230°.

It has also been well established that there is a definite relation between effective transmission service and the angular length $a$ of a vertical antenna. The most effective day range is an antenna length of 230°, and 190° represents the maximum night transmission. Instead of expressing the antenna length as degrees, the length may be determined in percentages of the length of the transmitted wave. For example, $$190° = \frac{190°}{360°}x\lambda = 0.528\lambda$$

If the factors of wave length, optimum day or night range, and height of antenna are given, it is possible to calculate the critical distance $x$ at which F and B should be at a 90° time relation. If the antenna is adjusted so that F and B are at 90°, the maximum desired transmission characteristic will result. By way of example, Figure 3 represents a sectionalized antenna in which the total antenna height is $d$. The distance from the earth to the inductance coil 19 is $a$. The length of the sine wave above the inductance coil 19, if the coil were removed and the antenna extended, is $b$.

$D = 2\pi d/\lambda$ radians $= 360d/\lambda$ degrees
$A = 2\pi a/\lambda$ radians $= 360a/\lambda$ degrees
$B = 2\pi b/\lambda$ radians $= 360b/\lambda$ degrees
$k = 2\pi/\lambda$ $x=$ distance from base of antenna along ground 21.

$r^2 = a^2 + x^2$
$r_3^2 = d^2 + x^2$

Then the electromagnetic flux density at the surface of the earth a distance, $x$, from the base of the antenna is $$B = \frac{j\mu I_o}{2\pi x \sin G}\left[\cos B \epsilon^{-ikr_2} - \cos G \epsilon^{-ikx} + \frac{\sin B}{\sin (D-A)}(\epsilon^{-ikr_3} - \epsilon^{-ikr_2}\cos (D-A))\right]$$

The vertical electrical intensity at the same point is $$F = \frac{j\mu c I_o}{2\pi \sin G}\left[\frac{\cos B \epsilon^{-ikr_2}}{r_2} - \frac{\cos G \epsilon^{-ikx}}{x} + \frac{\sin B}{\sin (D-A)}\left(\frac{\epsilon^{-ikr_3}}{r_3} - \frac{\cos (D-A)}{r_2}x\epsilon^{-ikr}\right)\right]$$

Thus, after A, B and D have been decided upon, the two equations make it possible to determine the critical distance at which F and B must be at 90° relationship to produce the desired transmission characteristic. I have checked the mathematical equations and distance $x$ by experimental results and find the two agree. That is, I have adjusted the inductance coil 19 to produce a 90° relationship between F and B at distance $x$ and I have found this adjustment to be identical with more laborious process described in my copending application mentioned above.

I shall now describe the apparatus which is employed to determine the relationship between B and F. In Figure 4, 31 represents a loop antenna whose midpoint 33 is grounded. The loop may be tuned to resonance by variable capacity 35. The two terminals of the loop 31 are connected to switch points 37 and 39. Switch arm 41 connects either switch point 37 or 39 with grid 43 of amplifier tube 45. The cathode 47 is shown grounded but a suitable bias may be applied between cathode and ground. The anode 49 connects to resistance 51 which in turn is connected to the positive terminal of B battery 53. The negative terminal of the B battery 53 is grounded.

A detecting tube 55 has its grid electrode 57 coupled through capacity 59 to resistance 51. The grid is grounded through grid leak resistance 61. The anode 63 is connected through a suitable indicating meter 65 to the positive terminal of the B battery 53.

Positioned near the loop is a vertical antenna or rod 67 which may be about a meter long. The vertical antenna 67 is grounded through a relatively high resistance 69. The grounded terminal of the resistance 69 is connected to cathode 71 of tube 73. The grid 75 is connected to the junction of the antenna 67 and the resistance 69. The anode 77 is joined to the anode 49.

In operation, the critical distance from the base of the tower is determined by calculation as explained above. The apparatus of Figure 4 is set up at the calculated position. The loop is adjusted to resonate at the transmission frequency and is pointed at the transmitting antenna. The transmitting antenna is excited with low power so that oscillatory currents in the order of one milliampere are induced. The inductance coil 19 is adjusted until the switch 41 may be placed in contact with switch point 37 or switch point 39 without changing the indication of meter 65. Under this condition the electromagnetic flux B and the electric strain F will be in 90° time relation.

Briefly, the theory of operation of the circuits of Figure 4 is that the voltage induced in the resonant loop is in time quadrature with the electromagnetic flux linking the loop. The voltage induced in the rod antenna is in phase with the vertical electric strain along the rod. Thus, if the voltage set up across the tuning condenser is in time quadrature and at 90° with the electric strain, the reading resulting from the voltages applied to the grids of the two amplifier tubes and applied across the common resistance 51, will be unaltered as the switch arm 41 is connected with switch point 37 or switch point 39. For any angular time relation between B and F other than 90°, the meter will indicate a change in the voltage set up across the resistor 51 as the switch is changed from one point to the other.

Instead of using low power in the antenna and amplifier apparatus illustrated in Figure 4, the voltages impressed on the loop and vertical antenna rod may be applied to the deflecting electrodes of a cathode ray oscillograph. The cathode, anode, accelerating electrodes, screen, and batteries of the cathode ray tube are omitted from Figure 5, as the circuits for cathode ray tubes are well known to those skilled in the art. In this figure, the deflecting plates are illustrated as 101, 103, 105 and 107. The plates 101 and 103 are joined to the loop terminals. The plates 105 and 107 are connected to the tuned circuit 109 which is coupled to the vertical rod antenna 111 by inductance coil 113. When using the cathode ray tube as the indicating device, high transmitting power is applied to the transmitting antenna. The apparatus is set up as before, and if F and B are at 90°, a single straight inclined line, represented as 115, will appear on the screen of the cathode ray tube. If the phase between B and F is not 90°, an ellipse or other geometrical pattern will appear on the screen.

I have described the method of determining the critical distance from the base of a vertical antenna at which the electric and electromagnetic fluxes are in 90° phase relationship. I have shown how this critical distance is related to the effective antenna height and maximum transmission service. The mathematical treatment of a sectionalized antenna is an illustration of one type of antenna. Similar equations may be derived by those skilled in the art for capacity top antennas, and other types of antenna structures. Although I have illustrated two simple types of apparatus for determining the 90° phase relationship, I do not wish to be so limited. It will be apparent that various modifications may be made in my invention without departing from the spirit and scope thereof, and I desire, therefore, that only such limitations shall be imposed thereon as are necessitated by the prior art and set forth in the appended claims.

I claim:

1. In an apparatus of the character described, a resonant balanced loop antenna, a vertical antenna, a resonant circuit coupled to said vertical antenna, said coupling being the sole means of applying energy to said resonant circuit, a cathode ray tube having two pairs of deflecting electrodes, connections from one pair of said electrodes to said resonant loop antenna, and connections from the resonant circuit coupled to said vertical antenna to the second pair of deflecting electrodes.

2. The method of adjusting an antenna system, which has means for adjusting the angle of radiation for maximum effective transmission which comprises calculating, for the required transmission service, the critical distance from said antenna at which the electromagnetic and electric fluxes set up by oscillatory currents in said antenna should bear a 90° phase relation, measuring said critical distance from said antenna, and adjusting said antenna system until the electromagnetic and electric fluxes bear a 90° phase relation at the measured critical distance.

3. The method of adjusting an antenna system, which has means for adjusting the angle of radiation for maximum effective transmission service by means of an apparatus which comprises, a loop resonant to currents induced by an electromagnetic flux, a vertical antenna responsive to electric flux, means for combining voltages created by said fluxes, and means for indicating the relative phases of said voltages which comprises calculating, for the required transmission service, the critical distance from the antenna at which the electric flux and the electromagnetic flux should be at 90° time relationship; impressing the electric flux at the critical distance on said vertical antenna responsive to electric flux; impressing the electromagnetic flux at the critical distance, on said loop responsive to electromagnetic flux; combining voltages induced by said fluxes; indicating their relative phases; and adjusting said antenna until a phase relationship of 90° is indicated.

4. The method of adjusting an antenna system, which includes means for varying the angle of radiation for maximum effective night transmission of a wave of given frequency by means of an apparatus which comprises, a loop resonant to currents induced by an electromagnetic flux, a vertical antenna responsive to electric flux, means for combining voltages created by said fluxes, and means for indicating the relative phases of said voltages which comprises determining by calculation the critical distance from said antenna at which the electromagnetic and electric fluxes should bear a 90° time relationship for the maximum effective night transmission service, erecting at the critical distance said loop responsive to electromagnetic flux and said vertical antenna responsive to electric flux, combining voltages induced in said elements by said fluxes whereby said voltages operate a common indicator, and adjusting said antenna system until the common indicator shows the combined voltages are induced by fluxes bearing a 90° phase relationship.

5. The method of adjusting a wave transmission system, which includes means for regulating the angle of radiation, by means of an apparatus which comprises, a loop resonant to currents induced by an electromagnetic flux, a vertical antenna responsive to electric flux, means for combining voltages created by said fluxes, and means for indicating the relative phases of said voltages which comprises energizing said system, erecting at a critical distance from said transmission system said loop responsive to electromagnetic flux change, and said vertical antenna responsive to an electric flux change, adjusting said wave transmission system until said flux responsive loop and vertical antenna have induced in them voltages indicating a 90° relationship between the flux changes inducing said voltages.

6. The method of adjusting a wave transmission system, which includes means for regulating the angle of radiation, which comprises, energizing said system with oscillatory currents of the required frequency, determining the critical distance from said antenna for maximum transmission at day or night at which said oscillatory currents induce an electromagnetic flux separated by 90° in time from an induced electric flux, adjusting said antenna system until at the critical distance said fluxes bear a 90° phase relation.

GEORGE H. BROWN.